Patented Dec. 16, 1952

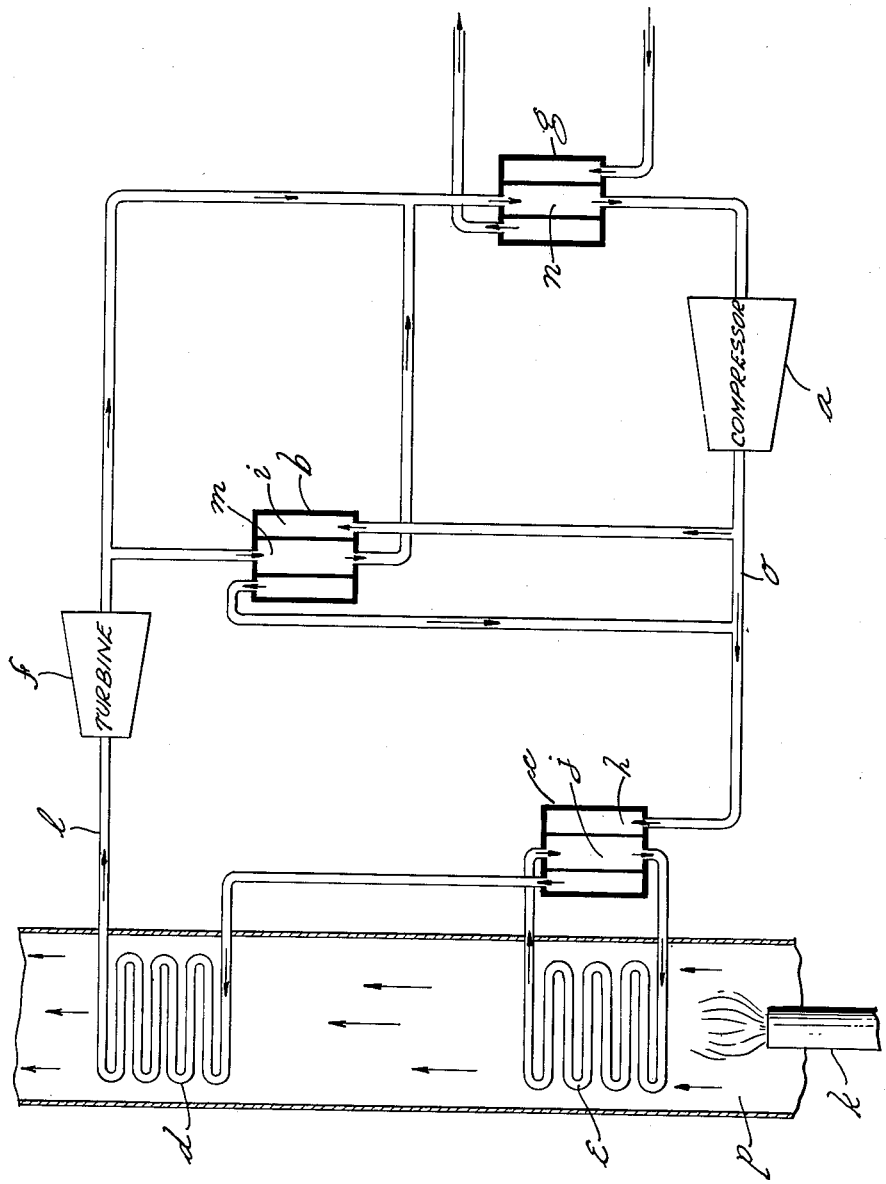

2,621,481

UNITED STATES PATENT OFFICE 2,621,481

CLOSED CYCLE AIR TURBINE POWER PLANT HAVING DIRECT AND INDIRECT HEAT EXCHANGERS

Andrew Thomson Bowden, Newcastle-on-Tyne, England, assignor to C. A. Parsons & Company Limited, Newcastle-on-Tyne, England Application August 15, 1947, Serial No. 768,728
In Great Britain September 25, 1946

2 Claims. (Cl. 60—59)

This invention relates to turbine plants of the kind in which a gaseous working medium after compression in one or more compressors to a pressure above atmospheric pressure is heated by an external source of heat and thereafter expanded in one or more turbines driving the aforesaid compressor or compressors and/or providing a source of useful external energy.

With the direct heating of a working medium difficulties arise because, for example, of its low heat capacity and consequent tendency towards the formation of slag on the heating tubes through which it is circulated when, for example, a fuel such as coal is employed as the source of heat supply.

The object of the present invention is to provide arrangements whereby these difficulties may be eliminated or reduced to a minimum.

The invention consists in a gas turbine plant of the kind indicated wherein the working medium is heated partly directly by the products of combustion of a solid, liquid or gaseous fuel and partly through the intermediary of an auxiliary fluid or fluids which also receive heat from the said products of combustion.

The invention also consists in a gas turbine plant as set forth in the preceding paragraph wherein said auxiliary fluid has a higher heat capacity than that of said medium.

The invention also consists in gas turbine plants as set forth in either of the two preceding paragraphs wherein the working medium circulates in a closed or open circuit.

The invention also consists in gas turbine plants as set forth in any of the three preceding paragraphs wherein the working medium after passing from the turbine or turbines is led directly or in entirety or in part through a heat exchanger to a cooler preceding the compressor inlet.

The invention also consists in a gas turbine plant substantially as hereinbefore described with reference to the accompanying drawing.

The accompanying diagrammatic drawing illustrates one convenient arrangement of gas turbine plant embodying the present invention.

In accordance with the invention by the use of an auxiliary fluid or fluids of higher heat capacity than that of the working medium—which auxiliary fluid takes up heat from the products of combustion of the fuel and in turn give up such heat to the working medium in a suitable heat exchanger, sufficient heat having been extracted from the products of combustion by the intermediary fluid to reduce the temperature conditions of the former to a suitable figure, for example, the fusion point of the ash, when coal is used as the source of heat supply—the said products of combustion may give up additional heat to the working medium by direct contact with the channels through which it is circulating.

In a particular application the working fluid is air, the source of heat supply is coal and the intermediary fluid water, steam, or a mixture of water and steam.

In carrying the invention into effect according to one form illustrated by way of example in the accompanying drawing as applied to a closed circuit arrangement, an air compressor $a$ is provided the air from which is led to a channel $h$ of a heat exchanger $c$ directly by way of pipe $o$ or alternatively in whole or in part through a channel $i$ of a heat exchanger $b$ where it takes up heat from the hotter working medium exhausted from a turbine $f$. In a heat exchanger $c$ the working medium receives heat from an intermediary fluid, e. g. water, of higher heat capacity than that of air, which is circulated through a cooperating channel $j$. The auxiliary fluid in turn receives heat from the products of combustion in a heat exchanger pipe $e$ within a fire-chamber $p$ which is fired by solid, liquid or gaseous fuel as by means of the burner $k$ schematically indicated in the drawing. The air is then further heated in the pipe of a heater $d$ by the said products of combustion after these latter have given up heat as aforementioned to the intermediary fluid.

On exit from the pipe $d$ the air passes by way of a pipe $l$ to the turbine $f$ and after expansion therein is led in its entirety or in part through a channel $m$ of the heat exchanger $b$, or alternatively, directly to a pipe $n$ of a cooler $g$ and hence to the inlet of compressor $a$.

What is claimed is:

1. In a gas turbine plant having a turbine and a compressor for supplying the working medium thereto, a heating system comprising a burner and a fire chamber for receiving combustion products therefrom, a heat exchanger for the indirect heating of the working medium having a channel for aforesaid working medium and a cooperating channel for an auxiliary fluid, part of said cooperating channel being situated inside the fire chamber for the heating of the auxiliary fluid which in turn gives up its heat to the working medium, the channel for auxiliary fluid being arranged for transferring to the working medium channel substantially all the heat extracted from the fire chamber, a further heat exchanger for the direct heating of the working medium situated in the fire chamber downstream of the auxiliary fluid channel of the first mentioned heat exchanger, and having channels, around the outside of which the combustion products flow, giving up their heat to the working medium flowing inside the channels, said working medium entering the said turbine on leaving this heat exchanger.

2. A gas turbine plant and heating system therein as claimed in claim 1, wherein the auxiliary fluid has a greater heat capacity than the working medium.

ANDREW THOMSON BOWDEN.

REFERENCES CITED

The following references are of record in the file of this patent:

UNITED STATES PATENTS

| Number | Name | Date |
|---|---|---|
| 1,931,426 | Baumann | Oct. 17, 1933 |
| 1,993,585 | Baumann et al. | Mar. 5, 1935 |
| 2,086,781 | Rosencrants | July 13, 1937 |
| 2,130,894 | Muir | Sept. 20, 1938 |
| 2,162,746 | Randel | June 20, 1939 |
| 2,234,869 | Loveless | Mar. 11, 1941 |
| 2,268,074 | Keller | Dec. 30, 1941 |
| 2,298,625 | Larrecq | Oct. 13, 1942 |
| 2,410,457 | Nettel | Nov. 5, 1946 |
| 2,419,463 | Ruegg | Apr. 22, 1947 |
| 2,421,387 | Lysholm | June 3, 1947 |
| 2,470,729 | Stalker | May 17, 1949 |